(12) United States Patent
De Baer et al.

(10) Patent No.: US 9,176,786 B2
(45) Date of Patent: Nov. 3, 2015

(54) DYNAMIC AND AUTOMATIC COLOCATION AND COMBINING OF SERVICE PROVIDERS AND SERVICE CLIENTS IN A GRID OF RESOURCES FOR PERFORMING A DATA BACKUP FUNCTION

(75) Inventors: Joachim F. M. De Baer, Sint-gillis-Waas (BE); Robert A. Wipfel, Draper, UT (US)

(73) Assignee: NOVELL, INC., Provo, UT (US)

( * ) Notice: Subject to any disclaimer, the term of this patent is extended or adjusted under 35 U.S.C. 154(b) by 747 days.

(21) Appl. No.: 12/290,865

(22) Filed: Nov. 4, 2008

(65) Prior Publication Data

US 2010/0115098 A1 May 6, 2010

(51) Int. Cl.
*G06F 15/173* (2006.01)
*G06F 9/50* (2006.01)
*H04L 29/08* (2006.01)
*G06F 9/455* (2006.01)
*H04L 29/06* (2006.01)

(52) U.S. Cl.
CPC .......... *G06F 9/5077* (2013.01); *G06F 9/45533* (2013.01); *H04L 29/06* (2013.01); *H04L 29/08072* (2013.01)

(58) Field of Classification Search
CPC .......................... H04L 29/08072; H04L 29/06
USPC .................. 707/640, 609, 661; 709/223, 226; 711/162
See application file for complete search history.

(56) References Cited

U.S. PATENT DOCUMENTS

| | | | |
|---|---|---|---|
| 5,771,354 A * | 6/1998 | Crawford | 709/229 |
| 7,093,086 B1 | 8/2006 | van Rietschote | |
| 7,187,919 B2 * | 3/2007 | Fukuzato | 455/410 |
| 7,533,229 B1 * | 5/2009 | van Rietschote | 711/161 |
| 7,584,225 B2 * | 9/2009 | Jiang et al. | 1/1 |
| 8,086,836 B2 | 12/2011 | Chong et al. | |
| 8,205,050 B2 * | 6/2012 | De Baer | G06F 9/45533 711/162 |
| 8,311,225 B2 * | 11/2012 | Singh et al. | 380/279 |
| 8,732,313 B2 * | 5/2014 | Gulati et al. | 709/226 |
| 2006/0015641 A1 * | 1/2006 | Ocko et al. | 709/236 |
| 2007/0271428 A1 | 11/2007 | Atluri | |
| 2007/0300221 A1 | 12/2007 | Hartz et al. | |

(Continued)

OTHER PUBLICATIONS

Zhirou Zhang, Generalized Data Center Architecture Based on Network Storage and Backup. May 2008, 978-0-7695-3290-5/08, IEEE.*

(Continued)

*Primary Examiner* — Khanh Dinh
(74) *Attorney, Agent, or Firm* — King & Schickli, PLLC (57) ABSTRACT

In a computing environment, a method for providing a data backup function without transferring data across a local area network includes providing a plurality of resources including at least a client resource requiring a periodic servicing operation, a service provider resource capable of providing that servicing operation. At least one of the client resource and the service provider resource, such as a data backup resource, are defined by virtual machines. The client resource and the service provider resource are transparently co-located by transferring the resource defined by a virtual machine to the physical machine hosting the other resource, and the service provider resource performs the data backup function without need of transferring the data being backed up across a local area network. Methods, computer systems, and computer programs available as a download or on a computer-readable medium for installation according to the invention are provided.

10 Claims, 4 Drawing Sheets

(56) References Cited

U.S. PATENT DOCUMENTS

| | | | |
|---|---|---|---|
| 2008/0184225 A1 | 7/2008 | Fitzgerald et al. | |
| 2008/0184229 A1 | 7/2008 | Rosu et al. | |
| 2009/0083443 A1* | 3/2009 | Ocko et al. | 709/248 |
| 2009/0138752 A1 | 5/2009 | Graham et al. | |
| 2009/0265706 A1 | 10/2009 | Golosovker et al. | |
| 2010/0306773 A1 | 12/2010 | Lee et al. | |
| 2013/0232491 A1 | 9/2013 | Radhakrishnan et al. | |

OTHER PUBLICATIONS

RemoteScan, Live Migration Adds to Virtual Machines' Appeal; Jul. 22, 2007; 2 pages; http://vmblog.com/archive/2007/07/22/live-migration-adds-to-virtual-machines-appeal.aspx.

Virtual Machine Backup Guide; VMWare; Nov. 21, 2007; 92 pages; http://www.vmware.com/support.

Novell ZENworks Orchestrator; 1 page; printed Sep. 17, 2008; http://www.novell.com/products/zenworks/orchestrator/overview.html.

Jon Stokes; Ars Technica Guide to Virtualization: Part I; Aug. 3, 2008; 7 pages; http://arstechnica.com/guides/other/virtualization-guide-1.ars.

Jiang, et al.; "SODA: A Service-On-Demand Architecture for Application Service Hosting Utility Platforms"; Proceedings of the 12th IEEE International Symposium on High Performance Distributed Computing (HPDC'03); 2003; 10pages.

Non-Final Office Action for U.S. Appl. No. 12/977,633 dated Sep. 28, 2012.

Non-Final Office Action for U.S. Appl. No. 12/977,633 dated Jan. 13, 2014.

Final Office Action for U.S. Appl. No. 12/977,633 dated Jun. 4, 2014.

* cited by examiner

FIG. 4 ial traffic.
DYNAMIC AND AUTOMATIC COLOCATION AND COMBINING OF SERVICE PROVIDERS AND SERVICE CLIENTS IN A GRID OF RESOURCES FOR PERFORMING A DATA BACKUP FUNCTION

FIELD OF THE INVENTION

Generally, the present invention relates to computing methods and systems for providing servicing operations. Particularly, it relates to computing methods and systems, and devices incorporating the methods and systems, for providing servicing operations such as data backup operations while significantly reducing bandwidth consumption.

BACKGROUND OF THE INVENTION

In a grid of resources (physical computing devices, virtual machines, client applications, service provider resources and applications, etc.) certain of these resources will host services for consumption by other resources. A non-limiting example is a resource that hosts a backup server. Conventional communications between a service provider resource (i.e., a resource providing a servicing operation) and a client resource (i.e., a resource requiring a servicing operation) consume resources, e.g. in the form of bandwidth consumed during communication between the resources. Remaining in the example of a data backup operation, the backup operation may involve network traffic which is sent from the client resource to the service provider resource.

Thus, in a typical data backup operation, computer system users may create redundant or backup copies of data stored on various storage devices, which may be accessed to restore the data in the event of a catastrophic failure. In the typical situation, backup software is contained on a computer system, and a backup operation is scheduled to occur automatically and periodically. The computer system hosting the backup software may be remote from the computer system hosting the client resource requiring backup. The computer system hosting the backup software communicates directly with a computer system hosting a client resource, such as a database or application requiring backup, and streams backup traffic therefrom, typically over a local area network (LAN). While effective for its intended purpose, such a backup operation consumes bandwidth, preventing or slowing other essential traffic.

To prevent such consumption of resources, there is a need in the art for methods and systems for providing such servicing operations which, while accomplishing the desired function, do not require transmission of data over local area networks and the attendant bandwidth consumption. Such methods and systems should contemplate automatic servicing operations, for example automatic and periodic data backup functions. Any improvements along such lines should further contemplate good engineering practices, such as relative inexpensiveness, stability, ease of implementation, low complexity, security, unobtrusiveness, etc.

SUMMARY OF THE INVENTION

The above-mentioned and other problems become solved by applying the principles and teachings associated with the hereinafter-described methods and systems for providing a servicing operation. It has been surprisingly discovered that the resources consumed (bandwidth) may be dramatically reduced by automatically and transparently co-locating the service provider resource and the client resource, prior to starting the servicing operation. In one embodiment, the service provider resource may be moved to the physical site of the client resource. Alternatively, the client resource may be moved to the physical site of the service provider resource. In yet another embodiment, the service provider resource may be terminated, moved to the physical site of the client resource (or vice versa), and re-booted prior to initiating the servicing operation. It is also of note that these steps occur without accessing a LAN, thus reducing bandwidth consumption.

In one aspect, there is provided a method for providing a servicing operation in a computing environment. The method includes providing a plurality of resources including at least a client resource requiring a periodic servicing operation, a service provider resource capable of providing that servicing operation, and a storage area network (SAN). The next step is transparently co-locating the client resource and the service provider resource, and causing the service provider resource to perform the servicing operation. At least one of the client resource and the service provider resource are provided as virtual machines.

The step of transparently co-locating the client resource and the service provider resource may be performed by one of transferring a virtual machine providing the client resource to a computing device hosting the service provider resource or transferring a virtual machine providing the service provider resource to a computing device hosting the client resource. Alternatively, the step of co-locating the client resource and the service provider resource may be performed by one of booting up the service provider resource in a computing device hosting the client resource or booting up the client resource in a computing device hosting the service provider resource. The steps of co-locating may be performed automatically on a predetermined time schedule, or may be performed in response to a specific user request. In one embodiment, the servicing operation is a data backup operation, and the service provider resource may be a virtual machine configured to provide a data backup operation. Alternatively, the client resource may be a virtual machine defining an application requiring a periodic data backup operation, and the service provider resource may be backup software hosted on a physical computing device.

In another aspect, a computing system is provided for performing a data backup function. The system includes a plurality of computing devices arranged locally and/or remotely, the plurality of computing devices defining at least a storage area network. The system includes also a plurality of applications arranged on one or more of the computing devices and a plurality of virtual machines arranged on one or more of the computing devices, wherein the virtual machines define applications and/or services. At least one data backup function is provided, defined by at least one virtual machine or by at least one application contained on at least one of the plurality of computing devices. Still further, a data orchestration tool is provided for transferring a virtual machine from one of the plurality of computing devices to another of the computing devices. The data backup operation is performed entirely on the storage area network after transfer of the virtual machine. The data orchestration tool may transfer a virtual machine defining the data backup function to a computing device requiring a periodic data backup operation, or may transfer a virtual machine defining an application requiring a periodic data backup operation to a computing device containing a data backup function.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for providing a servicing operation are hereinafter described.

Figure 1:
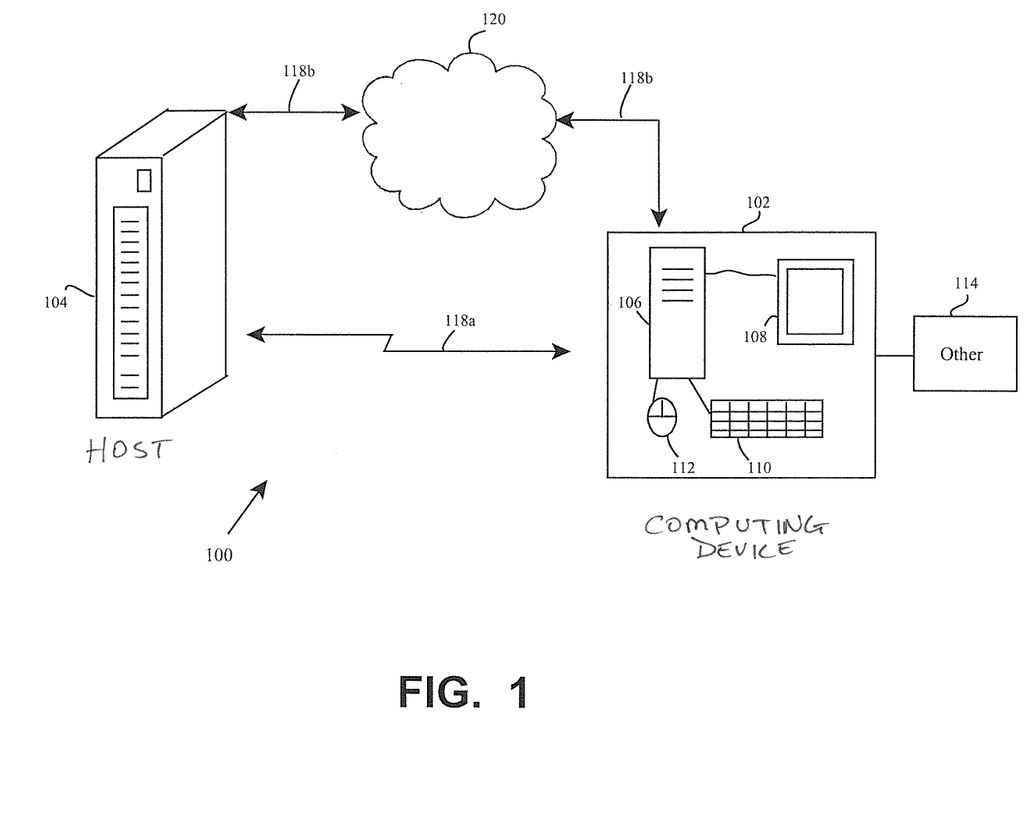
FIG. 1 schematically shows a computing system environment for providing a servicing operation in accordance with the present invention.

With reference to FIG. 1, a representative computing environment 100 includes a computing device 102 arranged as an individual or networked physical or virtual machine for senders and/or recipients of item(s), including a host 104 and clients arranged with a variety of other networks and computing devices. In a traditional sense, an exemplary host 104 typifies a server, such as a grid or blade server. Brand examples include, but are not limited to, a Windows brand Server, a SUSE Linux Enterprise Server, a Red Hat Advanced Server, a Solaris server or an AIX server. A computing device 102 may also include a server 106, such as a grid or blade server.

Alternatively, a computing device 102 includes a general or special purpose computing device in the form of a conventional fixed or mobile (e.g., laptop) computer 106 having an attendant monitor 108 and user interface, such as a keyboard 110 or a mouse 112. The computer internally includes a processing unit for a resident operating system, such as DOS, WINDOWS, MACINTOSH, LEOPARD, VISTA, UNIX, and LINUX, to name a few, a memory, and a bus that couples various internal and external units, e.g., "Other" 114, to one another. Representative "other" items 114 include without limitation PDA's, cameras, scanners, printers, microphones, joy sticks, game pads, satellite dishes, hand-held devices, consumer electronics, minicomputers, computer clusters, main frame computers, a message queue, a peer computing device, a broadcast antenna, a web server, an AJAX client, a grid-computing node, a virtual machine, a web service endpoint, a cellular phone, or the like. The other items may also be stand alone computing devices in the environment 100 or the computing device 102 itself.

Storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk for insertion in a drive of computer 106.

It will therefore be appreciated that the system 100 shown in FIG. 1 is configured to perform the tasks required of the present computer system/computing system environment as set forth above, and that computer program products providing computer executable instructions (software) for performing those tasks is contemplated. Computer executable instructions may be made available for installation as a download or may reside in hardware, firmware or combinations in the device 102. When described in the context of computer program products, it is denoted that items thereof, such as modules, routines, programs, objects, components, data structures, etc., perform particular tasks or implement particular abstract data types within various structures of the computing system which cause a certain function or group of functions.

In form, the computer product can be a download of executable instructions resident with a downstream computing device, or readable media, received from an upstream computing device or readable media, a download of executable instructions resident on an upstream computing device, or readable media, awaiting transfer to a downstream computing device or readable media, or any available media, such as RAM, ROM, EEPROM, CD-ROM, DVD, or other optical disk storage devices, magnetic disk storage devices, floppy disks, or any other physical medium which can be used to store the items thereof and which can be assessed in the environment.

In a network, the host 104 and computing device 102 communicate with one another via wired, wireless or combined connections 118 that are either direct 118a or indirect 118b. If direct, they typify connections within physical or network proximity (e.g., intranet). If indirect, they typify connections such as those found with the internet, satellites, radio transmissions, or the like, and are represented schematically as element 120. In this regard, other contemplated items include servers, routers, peer devices, modems, T# lines, satellites, microwave relays or the like. The connections may also be LAN, metro area networks (MAN), and/or wide area networks (WAN) that are presented by way of example and not limitation. The topology is also any of a variety, such as ring, star, bridged, cascaded, meshed, or other known or hereinafter invented arrangement.

In computer systems and computer system environments, it is known to provide virtual machines. Such virtual machines are known to the skilled artisan to be software implementations of computing devices which are capable of executing applications in the same fashion as a physical computing device. As examples, system virtual machines provide complete system platforms supporting execution of complete operating systems. Process virtual machines are intended to perform a single application or program, i.e., support a single process. In essence, virtual machines emulate the underlying hardware or software in a virtual environment. Many process, system, and operating system-level virtual machines are known to the skilled artisan.

Still further, it is known in the art to provide storage area networks (SAN). Depicted schematically in FIG. 2, a SAN system 200 provides a means for a computing device 102 and/or host 104 to utilize network protocol to connect to remote storage resources, for example disk arrays, optical jukeboxes, and/or tape drives or libraries, such as via an Internet Protocol network.

Figure 2:
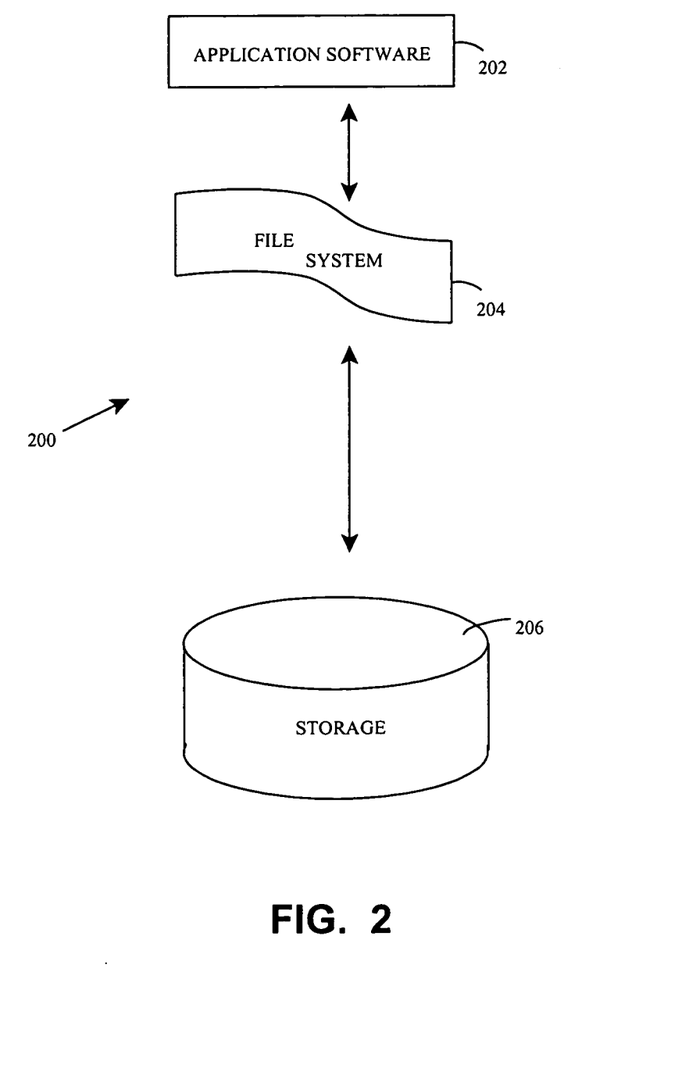
FIG. 2 depicts a representative Storage Area Network configuration.

In the embodiment schematically depicted in FIG. 2, application software 202 communicates with a file system 204. Typically, an internet SCSI (iSCSI; mapping SCSI over TCP/IP) protocol is implemented to allow the application to send SCSI commands over existing network infrastructure to file system 204. However, it is also known to utilize Fiber Channel Protocol over IP (mapping SCSI over Fiber Channel Protocol over IP), iSCSI Extensions for RDMA protocols (mapping SCSI over InfiniBand), Hyper SCSI (mapping SCSI over Ethernet), FICON mapping over Fiber Channel (typically for mainframe computing devices), mapping ATA over Ethernet protocols, Fiber Channel over Ethernet protocols, and the like.

File system 204 communicates with remote storage resource 206, which as discussed above may be disk arrays, optical jukeboxes, tape drives and/or libraries, and the like. A SAN often utilizes a Fiber Channel fabric topology for such communication, which is an infrastructure specially designed to handle storage communications. For comparison, a fabric is similar in concept to a network segment in a local area network. Advantageously, a Fiber Channel topology provides more rapid and reliable access in comparison to higher-level protocols. Ethernet communication, iSCSI protocols, and the like are also implemented according to the desired application.

An advantage of the SAN is that, from the point of view of the class drivers and any application software 202, the remote storage resources 206 simulate locally attached devices. Further, all applications are able to access all remote storage resources 206. It is known to use SAN protocols to provide storage consolidation and, and to mirror storage resources for disaster recovery purposes. That is, entire storage disk arrays may be migrated with minimal configuration changes, essentially making storage "routable" in a similar fashion as network traffic. Conventional uses for SAN systems include without limitation email servers, storage of large databases, high usage file servers, and the like.

Figure 3:
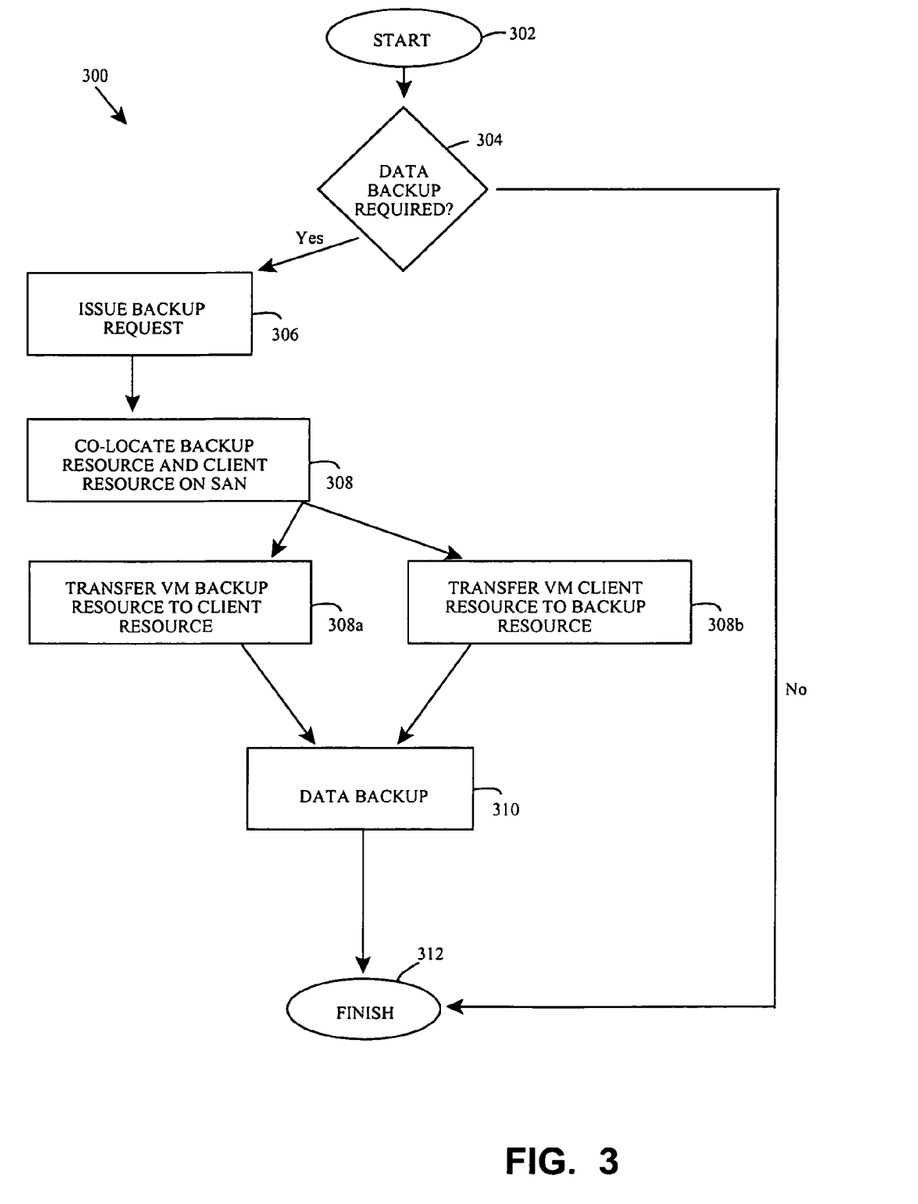
FIG. 3 is a flow chart depicting a servicing operation in accordance with the present invention.

A representative embodiment of the present invention will now be discussed. With reference to FIG. 3, the overall flow of a servicing operation as described herein is given generically as 300. In the depicted embodiment, the servicing operation is a data backup operation. At Start 302, a determination is made whether a data backup operation is required (step 304). This may be a periodic data backup performed on a predetermined schedule, such as at time intervals specified by the application default, or may be in response to a specific request by a user. If a backup operation is scheduled or requested, a backup request issues at step 306.

Next, at step 308, the backup resource and the client resource (that is, the application requiring a backup function) are co-located. In the event that the backup resource is defined by a virtual machine, the virtual machine defining the backup resource may be transferred to the physical computing device containing the client resource (step 308a). Alternatively, if the client resource is defined by a virtual machine, the virtual machine defining the client resource may be transferred to the physical computing device containing the backup resource (step 308b). At step 310, the data backup function is performed according to the backup resource's standard protocol.

An advantage of the above process will readily become aware to the skilled artisan. As described above, the co-location operation (which precedes the data backup operation in the depicted embodiment) is orchestrated and "transparent," in that the service provider resource (in the depicted embodiment being backup software) and the client resource are unaware that a co-location is even occurring. Rather, the service provider resource/client resource know only that they are streaming traffic to a predefined IP address on a physical computing device, i.e., they are merely and respectively providing and consuming the service.

Using the example of a data backup function as described herein, for conventional backup processes, the backup traffic would normally be streamed across the LAN. In contrast, in accordance with the present invention, the backup traffic does not leave the physical computing system because it is sent to a virtual machine moved onto that same physical computing system, i.e, to the predetermined IP address. For that reason, none of that backup traffic must access the LAN. Rather, as discussed above, all steps of the process occur on the SAN.

More specifically, prior to starting the data backup operation, a suitable application such as a data orchestration tool may transfer the virtual machine defining the backup resource onto the physical computing device containing a client resource requiring a backup operation. Alternatively, a virtual machine defining the client resource may be transferred by the data orchestration tool to a physical computing device containing the backup resource. The client resource and/or the backup resource may be an application hosted by the physical computing device, or may be defined by virtual machines.

In the example wherein the virtual machine defining the backup resource is transferred to co-locate with the client resource, after the transfer, the backup client in the virtual machine that needs to be backed up is initiated and starts streaming its traffic to the IP address of the backup server. Since the virtual machine that hosts the backup server is located on the same physical machine, the backup traffic is never seen on the LAN. Rather, all steps occur via in-memory copy. The virtual machine that hosts the backup resource has access to the SAN, so all backup traffic is SAN to SAN.

The operation then ends at step 312, such as by transferring the virtual machine to its point of origin or to another computing device. For example (not shown in FIG. 3 for convenience), the virtual machine defining the client resource may be transferred back to the computing device of origin. Similarly, the virtual machine defining the backup resource may be transferred back to the computing device of origin, or alternatively to another computing device requiring a servicing operation.

As described above, the step of transferring the virtual machine defining the backup resource or the client resource may be accomplished by a suitable data orchestration tool. Such tools are known in the art for use in automated arrangement, coordination, and management of computer systems, middleware, and services. Without intending to impose any limitation, one such orchestration tool contemplated for use in the present invention is the NOVELL® ZENWORKS® Virtual Machine Management. In the embodiment depicted in FIG. 3, live migration of the virtual machine is contemplated, that is, transfer of an active or running virtual machine from one computing device to another. A number of methods for live migration of virtual machines, and software packages for accomplishing such live migration, are known.

In an alternative embodiment, it may be necessary to provide the virtual machine direct access to the client resource. This would occur, as a non-limiting example, when it was desired and/or necessary to provide the virtual machine defining the service provider resource direct access to a Peripheral Component Interconnect (PCI) bus to provide the servicing operation. Of course, it will be appreciated that the example applies equally to the case when a virtual machine defines the client resource requiring a servicing operation. Exemplary PCI applications (PCI cards) include network cards, sound cards, modems, extra ports such as USB or serial ports, television tuner cards, and disk controllers.

Figure 4:
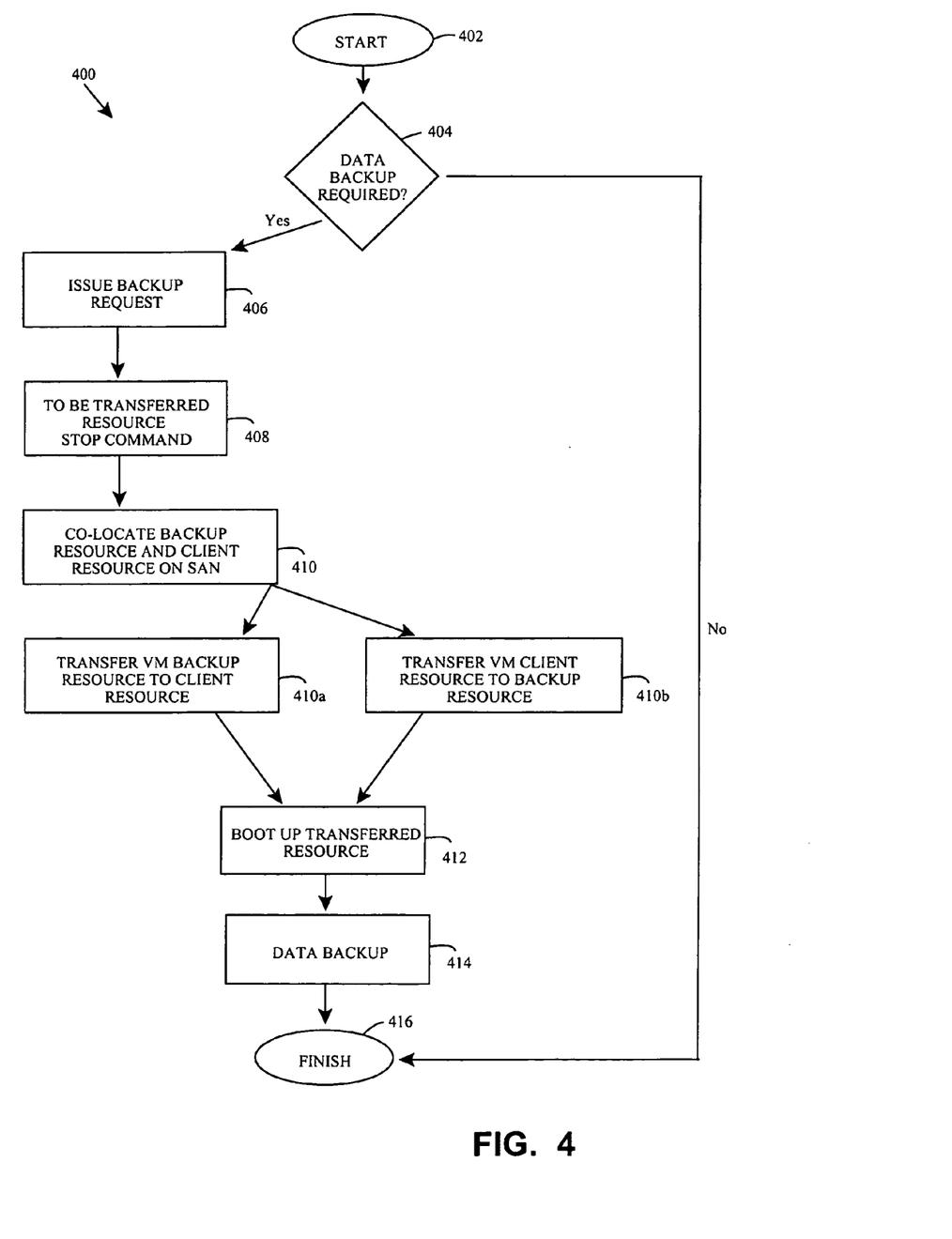
FIG. 4 is the flow chart shown in FIG. 3, modified to depict in sequence shut-down of the servicing resource, co-location of the servicing resource and client resource, and boot-up of the servicing resource to perform the service (data backup).

In this embodiment, shown as a flow chart in FIG. 4, the process would proceed in a similar manner as that depicted in FIG. 3. Prior to the co-location step (step 410 on FIG. 4), a stop command would be issued to the virtual machine resource (i.e., the client resource, the service provider resource, or both) at step 408. After transfer of the virtual machine resource (see steps 410a and/or 410b), at step 412 the transferred resource is booted up. In the embodiment wherein it is the service provider resource that is transferred (step 410a), the service provider resource is then booted up at step 412. Of course, in the embodiment wherein it is the client resource that is transferred to the computing device containing the service provider resource (see step 410b), the client resource would then be booted up (step 412). The process proceeds thereafter substantially as described above.

Certain advantages of the invention over the prior art should now be readily apparent. For example, the present disclosure sets forth a method for providing a servicing operation, computing systems and computing system environments for providing that operation, and particular computer program products in accordance with the method, which allow a servicing operation such as a data backup operation to take place entirely on a SAN. The process is applicable when either a client resource or a servicing resource are defined as virtual machines, and require no access to local area networks. That is, the co-location process is "transparent," in that neither the servicing resource nor the client resource are aware that the co-location is even occurring. Rather, the resources are only aware that they are streaming traffic to a particular IP address on the SAN. Advantageously, bandwidth and other such resource usage is significantly reduced while providing the desired servicing operation. These features contribute to providing an orchestrated, transparent servicing operation requiring no reconfiguration of any resources involved.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A method for providing a data backup function, comprising:
   providing a virtual machine configured for performing a periodic data backup function;
   providing a physical computing device hosting an application requiring the periodic data backup function;
   co-locating the virtual machine and the physical computing device by transferring the virtual machine to the physical computing device; and
   streaming data backup traffic from the virtual machine to a predefined internet protocol address associated with the physical computing device;
   whereby the data backup function is performed after the co-locating and entirely on a storage area network without streaming the data backup traffic across a local area network.

2. A method for providing a data backup function, comprising:
   providing a virtual machine requiring a periodic data backup function;
   providing a physical computing device hosting an application configured to perform the periodic data backup function;
   co-locating the virtual machine and the physical computing device by transferring the virtual machine to the physical computing device; and
   streaming data backup traffic from the virtual machine to a predefined internet protocol address associated with the physical computing device;
   whereby the data backup function is performed after the co-locating and entirely on a storage area network without streaming the data backup traffic across a local area network.

3. A non-transitory computer program product available for download or on a non-transitory computer-readable medium for installation with a computing device of a user, said computer program product comprising:
   an orchestration component for receiving a periodic request for a data backup operation and for automatically transferring a virtual machine to and from a first physical computing device; and
   a second physical computing device on which the data backup operation is performed in response to the request, the data backup function being performed by streaming data backup traffic from the virtual machine to a predefined internet protocol address associated with the second physical computing device after the transferring and entirely on a storage area network, whereby the data backup function is performed without streaming the data backup traffic across a local area network.

4. The computer program product of claim 3, wherein the virtual machine is configured for providing a data backup function and the request is received from the second physical computing device hosting an application in need of a periodic data backup operation.

5. The computer program product of claim 3, wherein the virtual machine requests a data backup operation and the second physical computing device contains an application configured to provide the data backup operation.

6. The computer program product of claim 3, wherein the orchestration component is a data orchestration tool configured for transferring the virtual machine to and from the first physical computing device and the second physical computing device.

7. The computer program product of claim 4, wherein the virtual machine is booted up in the second physical computing device.

8. A computing system for performing a data backup function, comprising:

a plurality of computing devices arranged locally and/or remotely, the plurality of computing devices defining at least a storage area network;

a plurality of applications arranged on one or more of the computing devices;

a plurality of virtual machines arranged on one or more of the computing devices, wherein the virtual machines define applications and/or services;

at least one data backup function defined by at least one virtual machine or by at least one application contained on at least one of the plurality of computing devices; and a data orchestration tool for transferring a virtual machine to and from one of the plurality of computing devices and another of the computing devices;

wherein the data backup function is initiated by, after transferring the virtual machine to the one of the plurality of computing devices by the data orchestration tool, streaming data backup traffic from the transferred virtual machine to a predefined internet protocol address associated with the one of the plurality of computing devices;

whereby the data backup function is performed entirely on the storage area network without transferring data backup traffic across a local area network.

9. The computing system of claim 8, wherein the data orchestration tool transfers a virtual machine defining a data backup function to a computing device requiring a periodic data backup operation.

10. The computing system of claim 8, wherein the data orchestration tool transfers a virtual machine defining an application requiring a periodic data backup operation to a computing device containing a data backup function.

* * * * *